(12) United States Patent
Kabetani et al.

(10) Patent No.: US 8,670,126 B2
(45) Date of Patent: Mar. 11, 2014

(54) OPTICAL INTERFERENCE MEASURING METHOD AND OPTICAL INTERFERENCE MEASURING APPARATUS

(75) Inventors: Yasuhiro Kabetani, Osaka (JP); Tomotaka Furuta, Osaka (JP); Seiji Hamano, Hyogo (JP); Fumio Sugata, Ehime (JP)

(73) Assignee: Panasonic Corporation, Osaka (JP)

( * ) Notice: Subject to any disclaimer, the term of this patent is extended or adjusted under 35 U.S.C. 154(b) by 478 days.

(21) Appl. No.: 13/015,102

(22) Filed: Jan. 27, 2011

(65) Prior Publication Data

US 2011/0181889 A1 Jul. 28, 2011

(30) Foreign Application Priority Data

Jan. 28, 2010 (JP) ................................ 2010-016384
Nov. 30, 2010 (JP) ................................ 2010-265851

(51) Int. Cl.
*G01B 9/02* (2006.01)
*G01B 11/02* (2006.01)

(52) U.S. Cl.
USPC .......................................... 356/479; 356/497

(58) Field of Classification Search
USPC ............. 356/497, 479, 485, 489; 250/227.19, 250/227.27
See application file for complete search history.

(56) References Cited

U.S. PATENT DOCUMENTS

| 7,751,056 B2 * | 7/2010 | Teramura ........................ 356/477 |
| 2011/0122413 A1 * | 5/2011 | Wojtkowski et al. ......... 356/451 |

FOREIGN PATENT DOCUMENTS

| EP | 2141447 | 1/2010 |
| JP | 4-174345 | 6/1992 |
| JP | 6-035946 | 5/1994 |
| JP | 2006-201087 | 8/2006 |
| JP | 2006-258557 | 9/2006 |
| JP | 2007-024677 | 2/2007 |

OTHER PUBLICATIONS

Leitgeb et al, Phase-shifting algorithm to achieve high-speed long-depth-range probing by frequency-domain optical coherence tomography, Nov. 15, 2003, vol. 28, No. 22, Optics Letters, pp. 2201-2203.*
Leitgeb et al, Complex ambiguity-free Fourier domain optical coherence tomography through transverse scanning, Dec. 1, 2007, vol. 32, No. 23, Optics Letters, pp. 3453-3455.*
Yasuno et al, Simultaneous B-M-mode scanning method for real-time full-range Fourier domain optical coherence tomography, Mar. 10, 2006, vol. 45, No. 8, Applied Optics, pp. 1861-1865.*

* cited by examiner

*Primary Examiner* — Kara E. Geisel
*Assistant Examiner* — Shawn Decenzo
(74) *Attorney, Agent, or Firm* — Hamre, Schumann, Mueller & Larson, P.C.

(57) ABSTRACT

In an optical interference measuring method according to the present invention, light emitted from a light source unit is split into measuring light and reference light, coherent light is detected that is obtained by interference of the reference light and the measuring light reflected from or scattered rearward from a measuring object, an optical-path length adjustment mechanism provided in the optical path of the reference light is driven to change the optical path length of the reference light, it is decided whether an image based on the detected coherent light is a normal image or a folded image based on the coherent light having varied with the change of the optical path length of the reference light, and the measuring object is measured from the detected coherent light based on a result of the decision about whether the image is a normal image or a folded image.

10 Claims, 10 Drawing Sheets

EXPANSION AND CONTRACTION

PRIOR ART

FIG. 14

PRIOR ART

FIG. 15

PRIOR ART

OPTICAL INTERFERENCE MEASURING METHOD AND OPTICAL INTERFERENCE MEASURING APPARATUS

The disclosure of Japanese Patent Application No. 2010-016384 filed Jan. 28, 2010 and No. 2010-265851 filed Nov. 30, 2010 including specification, drawings and claims is incorporated herein by reference in its entirety.

FIELD OF THE INVENTION

The present invention relates to an optical interference measuring method and an optical interference measuring apparatus, and particularly relates to a technique for generating coherent light by interference of reflected light and reference light, and measuring a measuring object by using the coherent light.

RELATED ART

Optical coherence tomography (OCT) is tomography using an interference phenomenon of light. OCT can achieve tomographic measurement with a high resolution of a slightly more than ten μm. Thus as disclosed in Japanese Patent Publication No. 6-35946 and Japanese Patent Laid-Open No. 2007-024677, OCT has been a notable technique for obtaining, e.g., a tomographic image of a structure such as a coating and a tomographic image of a living organism. OCT has been already put to practical use in the field of ophthalmology. For example, OCT is used for obtaining a tomographic image of a minute area such as a retina in an eyeball.

OCT includes time domain-OCT (TD-OCT) requiring scanning of a reference plane and frequency domain-OCT (FD-OCT) not requiring scanning of a reference plane. Further, FD-OCT is divided into a spectrometer type and a wavelength-scanning light source type.

FD-OCT of a wavelength-scanning light source type is called swept source-OCT (SS-OCT) measurement. In SS-OCT measurement, first, coherence light emitted from a light source is divided into measuring light to be emitted to a measuring object and reference light. Further, coherent light is generated by combination and interference of reflected light from the measuring object and the reference light, and a tomographic image is obtained based on the intensity of the coherent light. For example, a Michelson interferometer can be used in SS-OCT measurement.

Specifically, in SS-OCT measurement, coherent light is detected while the frequency of light emitted from the light source is changed with time. Further, the frequency components of an interferogram of an optical frequency region are analyzed by Fourier transform. Based on the analysis result, the intensities of light reflected from specific depths in the measuring object are detected, and a tomographic image is constructed using the detected intensities of reflected light.

Figure 12:
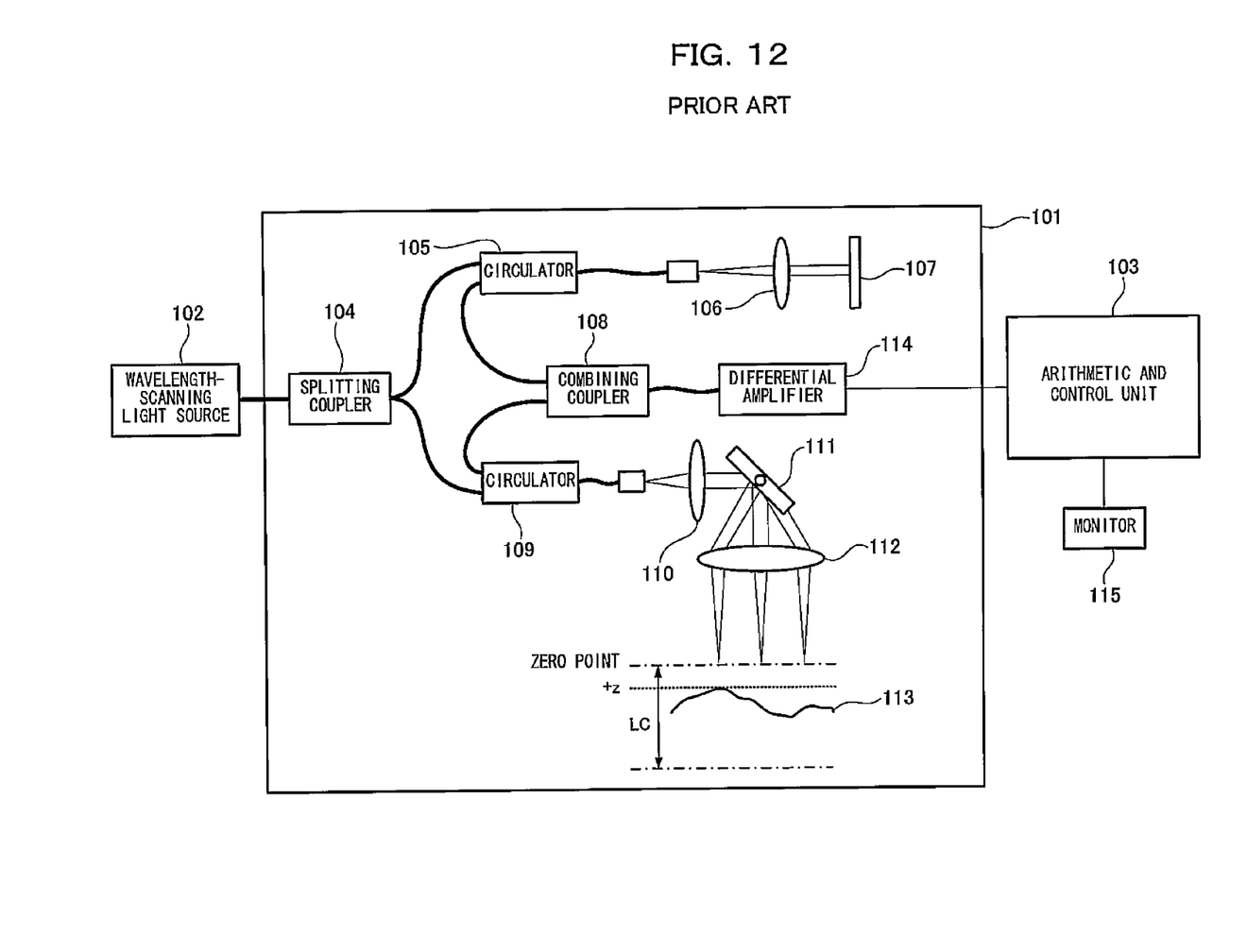
FIG. 12 schematically shows a structural example of a typical SS-OCT apparatus.

FIG. 12 schematically shows a structural example of a typical SS-OCT apparatus. As shown in FIG. 12, the SS-OCT apparatus includes an interferometer 101, a wavelength-scanning light source 102, and an arithmetic and control unit 103. The typical SS-OCT apparatus will be described below.

The wavelength-scanning light source 102 emits laser light whose frequency changes in a certain range. The laser light emitted from the wavelength-scanning light source 102 is incident on a splitting coupler 104 located in the interferometer 101. The splitting coupler 104 divides the incident laser light into measuring light to be emitted to a measured object and reference light.

The reference light passes through a circulator 105 and is incident on a collimating lens 106. The collimating lens 106 collimates the reference light. The reference light from the collimating lens 106 is emitted to a reference mirror 107 serving as a reference plane. The reference light reflected from the reference mirror 107 is incident on a combining coupler 108 through the collimating lens 106 and the circulator 105.

The measuring light passes through a circulator 109 and is incident on a collimating lens 110. The collimating lens 110 collimates the measuring light. The measuring light from the collimating lens 110 is incident on a galvanometer mirror 111. The galvanometer mirror 111 rotates in a certain range about an axis perpendicular to the plane of FIG. 12 and changes the reflection angle of the measuring light. The measuring light reflected from the galvanometer mirror 111 is focused by a focusing lens 112. The measuring light focused by the focusing lens 112 is emitted to a measured object 113.

Signal light, which is reflected light from the measured object 113, is incident on the combining coupler 108 through the focusing lens 112, the galvanometer mirror 111, the collimating lens 110, and the circulator 109.

The combining coupler 108 combines the reference light and the signal light and causes the light to interfere with each other. The optical beat signal of coherent light generated by the interference is detected by a differential amplifier 114 used as a photodetector.

The optical beat signal of the coherent light is transmitted to the arithmetic and control unit 103 after being detected by the differential amplifier 114. The arithmetic and control unit 103 analyzes the frequency components of the optical beat signal of the coherent light by Fourier transform, and detects the intensity distribution of light reflected from specific depths in the measured object 113. Further, the arithmetic and control unit 103 constructs a tomographic image based on the intensity distribution of the reflected light. The tomographic image is displayed on a monitor 115.

In the SS-OCT apparatus configured thus, when an optical path length H1 from the splitting coupler 104 to the combining coupler 108 through the reference mirror 107 is equal to an optical path length H2 from the splitting coupler 104 to the combining coupler 108 through the reflecting surface of the measured object 113, the optical beat frequency of the coherent light is zero. For convenience, the depth of the reflecting surface of the measured object 113 will be called a zero point when the optical beat frequency of the coherent light is zero.

When the reflecting surface of the measured object 113 is far from the wavelength-scanning light source 102 by a depth z from the zero point, the arrival of signal light at the combining coupler 108 is delayed from the reference light by the reciprocating time of light over the optical path length z from the zero point to the reflecting surface. The delay time length (time delay) is expressed by $2nz/c$ where c is a light velocity and n is the index of refraction of the measured object 113.

The frequency of laser light emitted from the wavelength-scanning light source 102 changes with time. Thus a frequency difference occurs between the reference light and the reflected light (signal light) that interfere with each other in the combining coupler 108 according to the time delay. The frequency difference is detected as an optical beat signal of the coherent light.

For example, it is assumed that the frequency of laser light emitted from the wavelength-scanning light source 102 changes so as to linearly increase with time, the change of the frequency is periodically repeated in a certain frequency range, and the reflecting surface of the measured object 113 is located only at the depth z from the zero point. In this case, the optical frequencies of the interfering reference light and reflected light (signal light) from the measured object change with time as indicated by line A (reference light) and line B (signal light) of FIG. 13.

Figure 13:
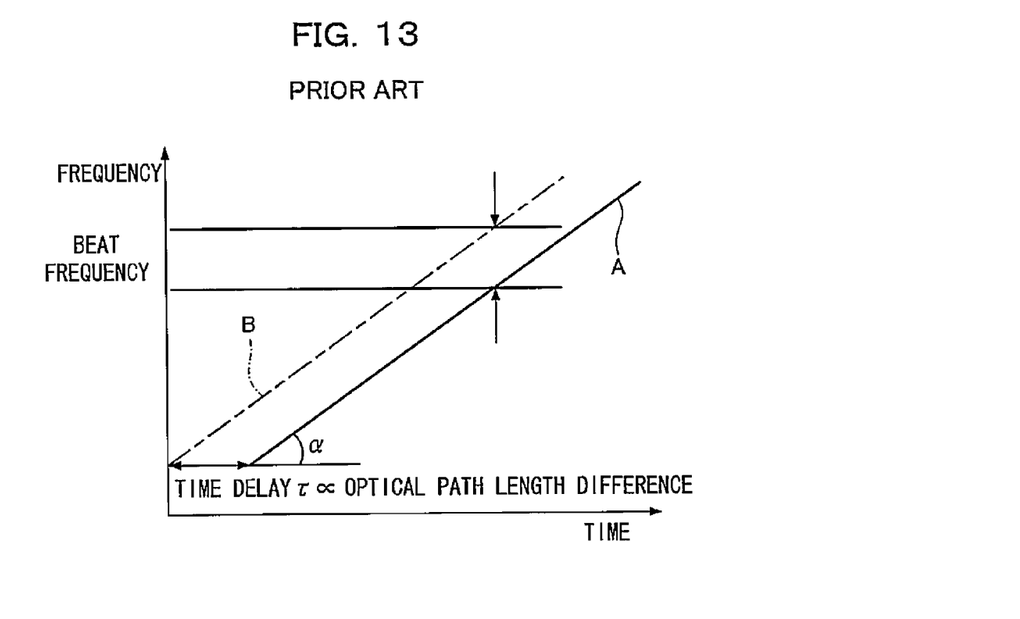
FIG. 13 shows the relationship between the frequencies of reference light and signal light in SS-OCT measurement.

The delay time (time delay) τ of the signal light (line B) relative to the reference light (line A) is expressed by τ=2nz/c where n is the index of refraction of the measured object 113. When the scanning rate of the frequency of light emitted from the wavelength-scanning light source 102 is α[Hz/s], the scanning time of the frequency of light emitted from the wavelength-scanning light source 102 is T[s], and a change of the frequency of light emitted from the wavelength-scanning light source 102 is Δf=αT[Hz] in the scanning time T[s], the intensity of coherent light received by the differential amplifier 114 fluctuates with a beat frequency fb expressed by (equation 1):

$$fb=\alpha\tau=(\Delta f/T)(2nz/c) \quad\quad \text{(equation 1)}$$

In reality, reflecting surfaces are located at different positions along the depth direction in the measured object 113 and rays of light are reflected from the respective reflecting surfaces. Therefore, the reflected rays of light have different time delays, that is, different frequency components according to the respective depths. For this reason, the optical beat signals of coherent light detected by the differential amplifier 114 (intensity variation of coherent light) are frequency-analyzed by Fourier transform, so that the intensities of reflected light (signal light) from the respective depths can be detected according to the optical beat frequencies based on (equation 1). A tomographic image can be constructed based on the spatial distribution of the intensities of the reflected rays of light.

In the case where the depth z of the reflecting surface relative to the zero point is larger than the coherence length of light emitted from the light source, the reflected light (signal light) does not interfere with the reference light, so that the optical beat signal cannot be detected. Even in the case where the depth z of the reflecting surface relative to the zero point is smaller than the coherence length of light emitted from the light source, the intensity of reflected light (signal light) cannot be correctly detected when the optical beat frequency proportionate to the depth z exceeds the response frequency of the photodetector or the arithmetic and control unit. Consequently, in SS-OCT measurement, a measurable range in the depth direction is limited by the coherence length of light emitted from the light source, the response frequency of the photodetector, and the response frequency of the arithmetic and control unit. The measurable range determined by these limitations in the depth direction is represented as LC.

The following will describe the case where the reflecting surface is located at position −z close to the light source relative to the zero point. In this case, the optical frequencies of the interfering reference light and reflected light (signal light) from the measured object change with time as indicated by line A (reference light) and line B (signal light) of FIG. 14.

Figure 14:
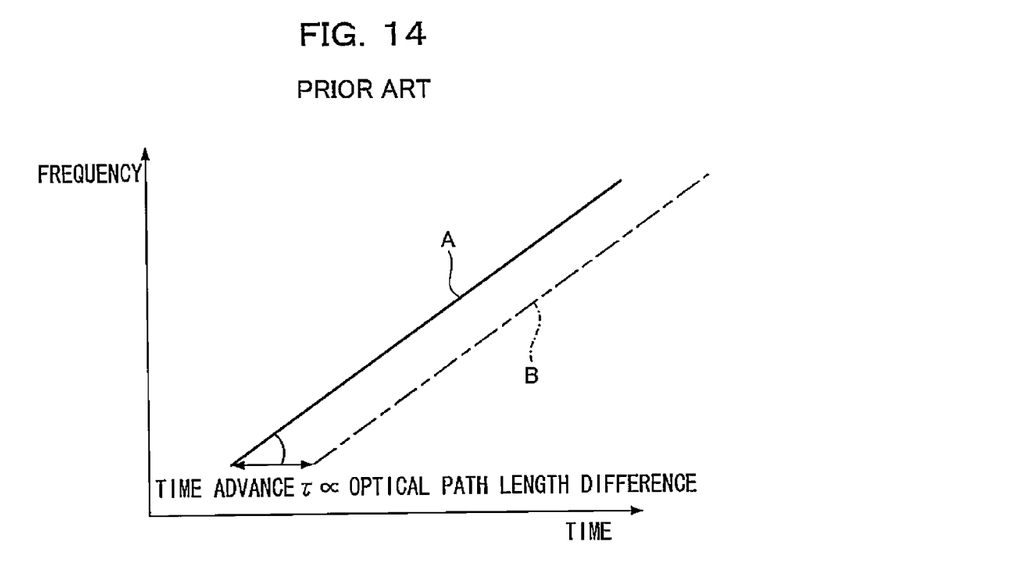
FIG. 14 shows the relationship between the frequencies of the reference light and the signal light in SS-OCT measurement.
Figure 15:
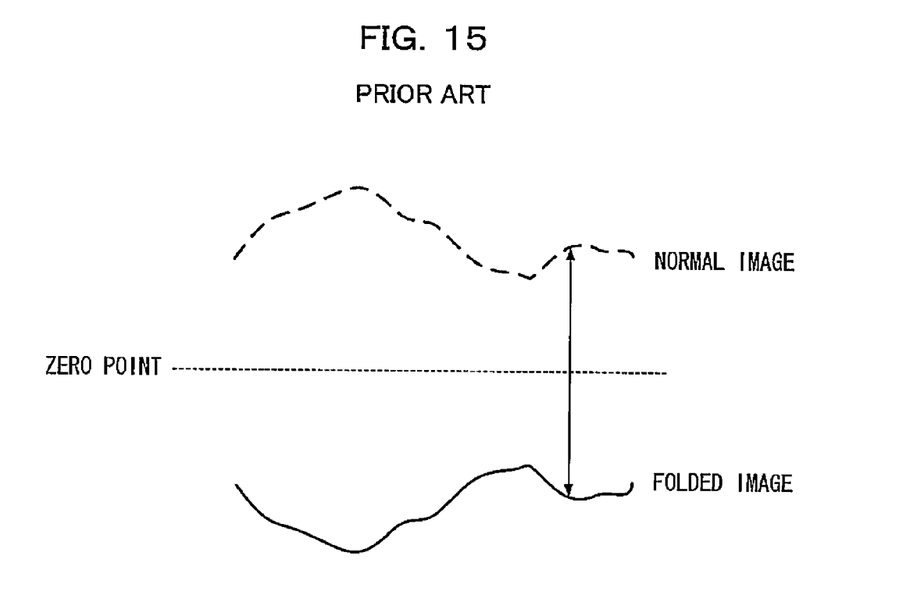
FIG. 15 shows the line symmetry of a normal image and a folded image in SS-OCT measurement.

When the reflecting surface is located only at the depth −z, as shown in FIG. 14, the frequencies of the reference light (line A) and the signal light (line B) have a reversed relationship from that of FIG. 13. However, in this case, the optical beat frequency is equal to that when the reflecting surface is located at the depth z from the zero point, which is proved by fb (−z)=−fb(z) from (equation 1).

Therefore, a fundamental problem of SS-OCT measurement is erroneous detection of a folded image of the reflecting surface located at the depth −z, which is closer to the light source than the zero point, as if the reflecting surface was located at the depth z, the image being inverted in the depth direction with respect to the zero point. In order to obtain a normal tomographic image of the reflecting surface without detecting a folded image, the reflecting surface to be measured has to be located between the zero point and the depth LC.

Thus when the position of the reflecting surface to be measured has been known, the reference mirror may be mechanically moved to adjust the optical path length of the reference light such that the reflecting surface is located between the zero point and the depth LC. Hence, it is possible to obtain a normal tomographic image without detecting a folded image. In order to obtain an adjustment value of the optical path length of the reference light, the position of the reflecting surface to be measured has to be known with accuracy of at least ±LC/2. When the position of the reflecting surface is unknown, the adjustment value of the optical path length of the reference light is also unknown, so that the optical path length of the reference light cannot be adjusted. Therefore, when the position of the reflecting surface is unknown or when the position of the reflecting surface is not known with accuracy of at least ±LC/2, it is not possible to decide whether or not an obtained tomographic image is a normal image or an image inverted with respect to the zero point.

Japanese Patent Laid-Open No. 2006-201087 discloses an optical coherent tomography (OCT) apparatus capable of removing the components of a folded image. The optical coherent tomography apparatus removes inverted components in optical beat signals or in the intensity distribution of reflected light by inverting the phase of reference light by means of an optical phase modulating mechanism provided in the optical path of the reference light.

In order to delete a folded image, however, the optical coherent tomography apparatus requires an optical phase modulating mechanism using expensive nonlinear crystals and a mechanism for controlling an amount of phase modulation.

SUMMARY OF THE INVENTION

An object of the present invention is to provide an optical interference measuring method that can solve the problem of a folded image of coherent light (optical beat signal) detected using an optical interference phenomenon.

Another object of the present invention is to provide an optical interference measuring apparatus that can solve the problem of a folded image of coherent light (optical beat signal) detected using an optical interference phenomenon.

In order to attain the object, an optical interference measuring method of the present invention includes: splitting light from a light source unit into measuring light and reference light; detecting coherent light obtained by interference of the reference light and the measuring light reflected from or scattered rearward from a measuring object; driving an optical-path length adjustment mechanism provided in the optical path of the reference light and changing the optical path length of the reference light; deciding whether an image based on the detected coherent light is a normal image or a folded image, based on the coherent light having varied with the change of the optical path length of the reference light; and measuring the measuring object from the detected coherent light, based on a result of the decision about whether the image is a normal image or a folded image.

Further, in order to attain the object, an optical interference measuring apparatus of the present invention includes: a light source unit for emitting light; an optical splitter for splitting light from the light source unit into measuring light and reference light; a coherent light detector for detecting coherent light obtained by interference of the reference light and the measuring light reflected from or scattered rearward from a measuring object; an optical-path length adjustment mechanism provided in the optical path of the reference light; and an arithmetic and control unit for deciding whether an image based on the coherent light is a normal image or a folded image, based on a change of the coherent light by driving of the optical-path length adjustment mechanism.

DESCRIPTION OF THE EMBODIMENT

Figure 1:
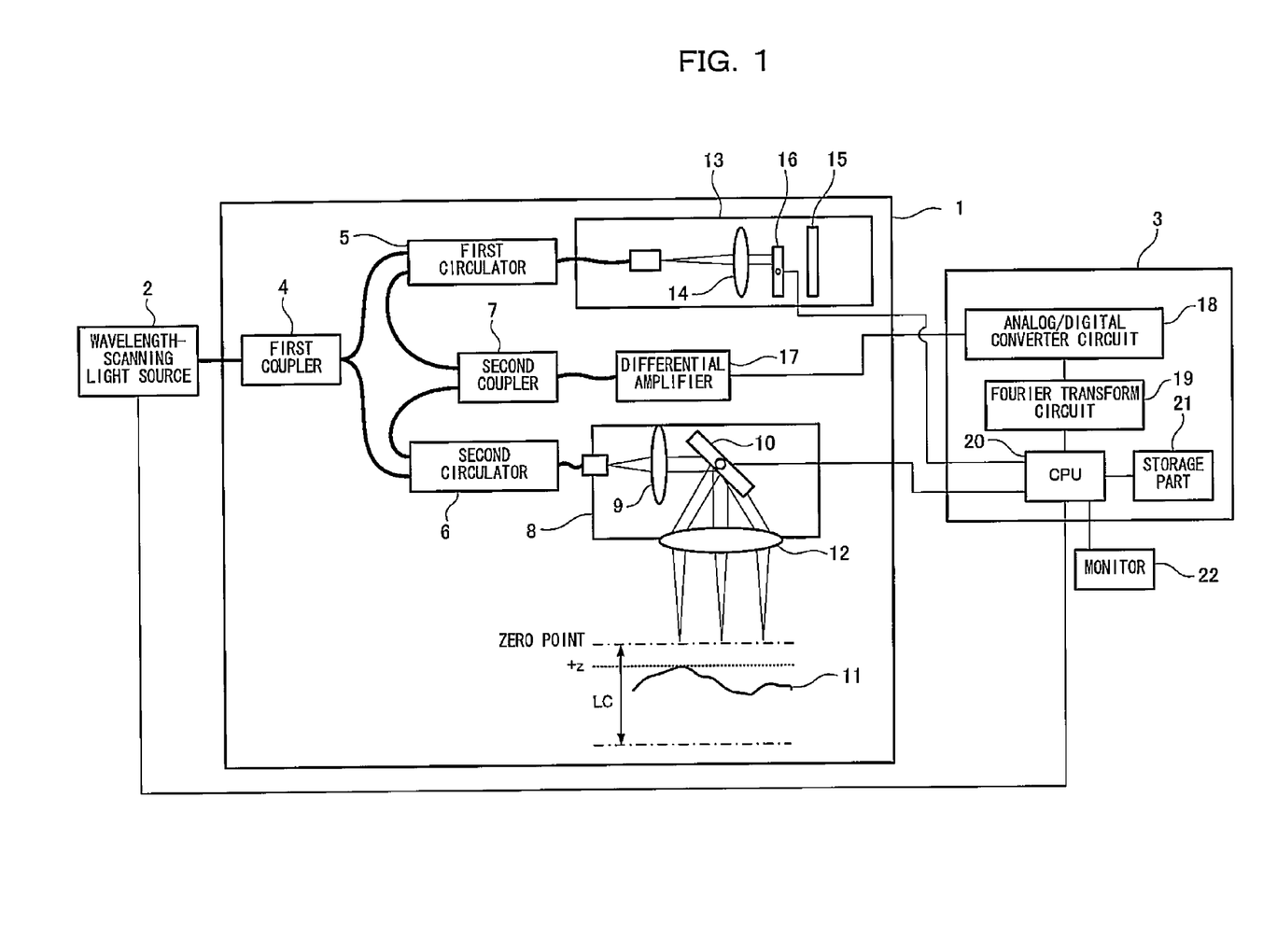
FIG. 1 schematically shows a structural example of an SS-OCT apparatus according to an embodiment of the present invention.

For example, an SS-OCT apparatus according to an embodiment of the present invention will be described below with reference to the accompanying drawings. FIG. 1 schematically shows a structural example of the SS-OCT apparatus according to the embodiment of the present invention. As shown in FIG. 1, the SS-OCT apparatus includes an interferometer 1, a wavelength-scanning light source 2, and an arithmetic and control unit 3.

The wavelength-scanning light source 2, which is an example of a light source unit, can emit light having a wavelength, that is, a frequency changing with a constant period. The wavelength-scanning light source 2 is connected to the interferometer 1 via an optical fiber. To be specific, the light emission port of the wavelength-scanning light source 2 is connected to the light receiving port of a first coupler 4, which is an example of an optical splitter, via the optical fiber. The optical splitter may be a directional coupler for dividing light into two with a fixed ratio.

One of the light emission ports of the first coupler 4 is connected to a first circulator 5 via an optical fiber. The other light emission port of the first coupler 4 is connected to a second circulator 6 via an optical fiber. The second circulator 6 is connected to the light receiving port of a second coupler 7, which is an example of a combiner, via an optical fiber and is also connected to a measuring head 8 via an optical fiber.

The measuring head 8 includes a collimating lens 9, a galvanometer mirror 10, and a focusing lens 12. The collimating lens 9 collimates light received from the optical fiber connected to the second circulator 6. The galvanometer mirror 10 changes the orientation of light received from the collimating lens 9. Further, the galvanometer mirror 10 can rotate about an axis perpendicular to the plane of FIG. 1 in a certain range. The focusing lens 12 is disposed between the galvanometer mirror 10 and a measuring object 11.

Measuring light passes through the second circulator 6 from the first coupler 4, is incident on the collimating lens 9 of the measuring head 8, and is collimated into parallel rays. The measuring light collimated into parallel rays is incident on the focusing lens 12 through the galvanometer mirror 10. The focusing lens 12 focuses the measuring light. The focused measuring light is emitted to the measuring object 11 set on a measuring object setting part. Light (signal light) is reflected from or scattered rearward from the reflecting surface of the measuring object 11 after the reflecting surface is irradiated with the measuring light, and the light is incident into the measuring head 8 through the focusing lens 12. After that, the signal light is reflected on the galvanometer mirror 10 and is incident on the second circulator 6 through the collimating lens 9.

In the present embodiment, the second circulator 6 and the measuring head 8 constitute a guide/irradiation unit that guides light and irradiates the measuring object 11 with the light. Further, in the present embodiment, the second circulator 6 and the measuring head 8 constitute a capturing unit that captures light reflected from or scattered rearward from the multilayer film of the measuring object 11. In other words, in the present embodiment, the second circulator 6 and the measuring head 8 constitute a guide/irradiation/capturing unit.

The first circulator 5 is connected to the light receiving port of the second coupler 7, which is an example of a combiner, via an optical fiber and is also connected to an optical-path length adjustment mechanism 13 of reference light via an optical fiber.

In the present embodiment, the optical-path length adjustment mechanism 13 includes a collimating lens 14, a reference plane 15, and a galvanometer mirror 16. The collimating lens 14 collimates light received from the optical fiber connected to the first circulator 5. The reference plane 15 reflects the light received from the collimating lens 14 and returns the light to the collimating lens 14. The galvanometer mirror 16 is disposed in an optical path between the collimating lens 14 and the reference plane 15. The galvanometer mirror 16 can rotate about an axis perpendicular to the plane of FIG. 1 in a certain range. The rotation of the galvanometer mirror 16 can be controlled by the arithmetic and control unit 3. A change of the optical path length of the reference light by the optical-path length adjustment mechanism 13 and the sign of the change are stored beforehand in the storage part of the arithmetic and control unit 3.

The light emission port of the second coupler 7 is connected to a differential amplifier 17, which is used as a photodetector, via an optical fiber. For example, a balanced photodiode may be used for the differential amplifier 17. The output part of the differential amplifier 17 outputs the time waveform of an optical beat signal as a signal to the arithmetic and control unit 3, which is an example of an image obtaining unit.

In the present embodiment, the second coupler 7 and the differential amplifier 17 constitute a coherent light detector that combines light (signal light) reflected from or scattered rearward from the measuring object 11 and the reference light, causes the signal light and the reference light to interfere with each other, and detects coherent light generated by the interference.

The arithmetic and control unit 3 includes an analog/digital converter circuit 18, a Fourier transform circuit 19, a CPU 20, and a storage part 21. The signal transmitted from the differential amplifier 17 is converted to a digital signal by the analog/digital converter circuit 18 and is transmitted to the Fourier transform circuit 19. The Fourier transform circuit 19 performs Fourier transform on the frequency component of the optical beat signal detected by the differential amplifier 17. The CPU 20 constructs a tomographic image based on the result of the Fourier transform by the Fourier transform circuit 19. The storage part 21 may be a memory or an HDD.

The output part of the arithmetic and control unit 3 is connected to the wavelength-scanning light source 2, the measuring head 8, the optical-path length adjustment mechanism 13, and a monitor 22. The monitor 22 displays calculation results from the CPU 20. The arithmetic and control unit 3 can control the wavelength-scanning light source 2, the measuring head 8, the optical-path length adjustment mechanism 13, and the monitor 22 based on inputted information. For example, under the control of the CPU 20, the wavelength-scanning light source 2 emits laser light whose wavelength periodically changes in a constant range. Moreover, under the control of the CPU 20, the galvanometer mirror 10 placed in the measuring head 8 is rotated and the measuring object 11 is scanned by the measuring light. In this configuration, the monitor 22 is an example of a display/output device. The display/output device may be, e.g., a printer in addition to a monitor.

Figure 2:
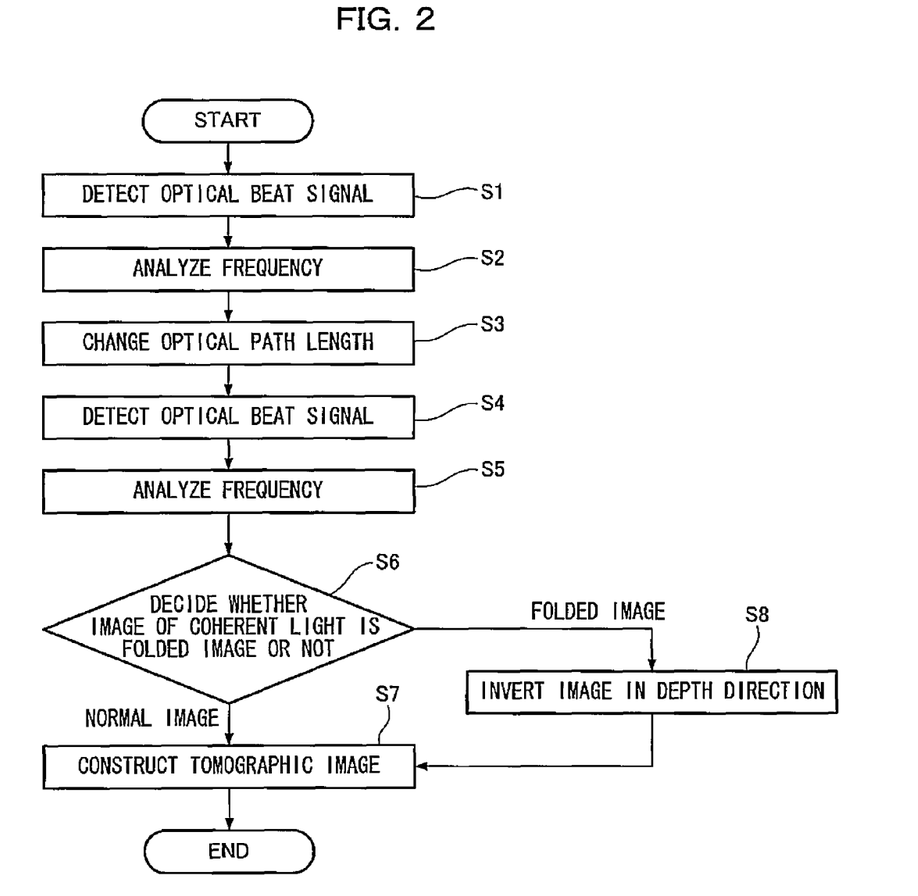
FIG. 2 is a flowchart showing an example of the operation of the SS-OCT apparatus according to the embodiment of the present invention.

FIG. 2 is a flowchart showing an example of the operation of the SS-OCT apparatus according to the embodiment of the present invention. To be specific, FIG. 2 is a flowchart showing an operation of deciding whether an image of an optical beat signal (coherent light) is a normal image or a folded image.

In step S1, the arithmetic and control unit 3 causes the wavelength-scanning light source 2 to emit light whose wavelength changes with time. The light emitted from the wavelength-scanning light source 2 is split by the first coupler 4 in a ratio of, e.g., 5% and 95%. The 5% light passes through the first circulator 5 and is collimated by the collimating lens 14. The collimated light is incident as reference light on the reference plane 15. The 95% light passes through the second circulator 6 and is incident on the measuring head 8. The light incident on the measuring head 8 is emitted as measuring light to the measuring object 11.

The light (reference light) incident on the reference plane 15 is reflected thereon, passes through the collimating lens 14 and the first circulator 5, and is incident on the second coupler 7. The light (signal light) reflected from or scattered rearward from the reflecting surface of the measuring object 11 is focused by the focusing lens 12 of the measuring head 8, passes through the second circulator 6, and is incident on the second coupler 7. The reference light and the signal light are combined by the second coupler 7 and are caused to interfere with each other. The optical beat signal of coherent light generated by the interference is detected by the differential amplifier 17.

Next, in step S2, the arithmetic and control unit 3 performs frequency analysis on the optical beat signal (intensity variation of coherent light), which has been detected by the differential amplifier 17, by using the Fourier transform circuit 19. Based on the frequency analysis result of the Fourier transform circuit 19 and (equation 2), which will be described later, the CPU 20 of the arithmetic and control unit 3 extracts a reflected light intensity (depth information about the measuring object 11) corresponding to the frequency of the optical beat signal. For example, when it is assumed that the reflecting surface of the measuring object 11 is located only at a depth z from the zero point, reflected light intensity distribution relative to the depth is obtained as shown on the left part of FIG. 3.

Figure 3:
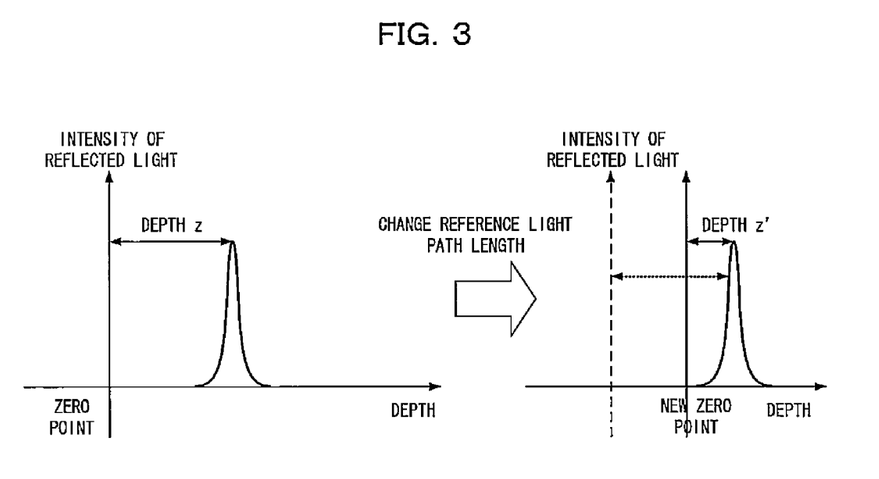
FIG. 3 shows a reflected light intensity distribution relative to a depth according to the embodiment of the present invention.

The delay time (time delay) $\tau$ of the signal light relative to the reference light is expressed by $\tau = 2nz/c$ where n is the index of refraction of the measuring object 11. In this case, when the scanning rate of the frequency of light emitted from the wavelength-scanning light source 2 is $\alpha$[Hz/s], the scanning time of the frequency of light emitted from the wavelength-scanning light source 2 is T[s], and a change of the frequency of light emitted from the wavelength-scanning light source 2 is $\Delta f = \alpha T$[Hz] in the scanning time T[s], a beat frequency fb of the coherent light received by the differential amplifier 17 is expressed by (equation 2) below:

$$fb = \alpha\tau = (\Delta f/T)(2nz/c) \quad \text{(equation 2)}$$

The arithmetic and control unit 3 stores the depth information about the measuring object 11 in the storage part 21, and then in step S3, the arithmetic and control unit 3 starts operating the optical-path length adjustment mechanism 13. The optical-path length adjustment mechanism 13 receives a signal from the arithmetic and control unit 3 and changes the optical path length of the reference light.

The optical-path length adjustment mechanism 13 will be described below. For example, the optical-path length adjustment mechanism 13 can be configured by combining the reference plane 15 and the galvanometer mirror 16 as shown in FIG. 4.

The inclination (rotation angle) of the galvanometer mirror 16 is controlled by the arithmetic and control unit 3. When the galvanometer mirror 16 is inclined as indicated by a broken line, reference light H is incident on the reference plane 15 without being blocked by the galvanometer mirror 16, and then returns to the collimating lens 14 from the reference plane 15. When the galvanometer mirror 16 is inclined perpendicularly to reference light H as indicated by a solid line, the reference light H is not incident on the reference plane 15. The reference light H is reflected on the galvanometer mirror 16 and returns to the collimating lens 14.

Figure 4:
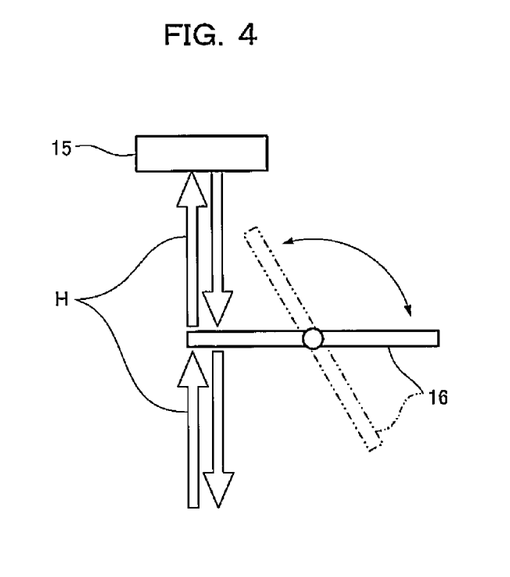
FIG. 4 is an explanatory drawing showing a structural example of an optical-path length adjustment mechanism according to the embodiment of the present invention.

Thus the optical-path length adjustment mechanism 13 shown in FIG. 4 can change the optical path length of the reference light in two steps by controlling the inclination of the galvanometer mirror 16. A difference in the optical path length of the reference light, that is, a change of the optical path length and the sign of the change can be determined based on the positional relationship between the galvanometer mirror 16 and the reference plane 15 and a change of the inclination (rotation angle) of the galvanometer mirror 16.

Preferably, a change of the optical path length and the sign of the change are calculated according to a change of the optical beat signal generated by a change of the optical path length of the reference light. In the present embodiment, by using the measuring object with the reflecting surface located at a known depth, a change of the optical beat signal is determined beforehand, when the optical path length of the reference light is changed by the optical-path length adjustment mechanism 13. In this case, by moving the measuring object in a direction z or moving the optical-path length adjustment mechanism 13 along the optical path length of the reference light, it is decided whether or not an image constructed using the optical beat signal is a folded image, thereby preventing the occurrence of a folded image. Further, a change of the optical path length of the reference light and the sign of the change are calculated according to a change of the optical beat signal. The calculation result is stored beforehand in the storage part 21 of the arithmetic and control unit 3.

In order to decide whether a change of the optical beat frequency is a positive change or a negative change, a change of the optical path length has to be at least the depth resolution of the SS-OCT apparatus. A large change of the optical path length is preferable. More preferably, the range of the change of the optical path length is equal to a measurable range LC.

Generally, a mechanism (optical-path length adjustment mechanism) for changing the optical path length of the reference light is a mechanical stage capable of mechanically translating a reference mirror. Unfortunately, because of restrictions such as the speed of travel, it takes a long time for a mechanical stage to significantly change the optical path length as compared with the measuring time (detection time of coherent light) of the SS-OCT apparatus. The measuring time of the SS-OCT apparatus is specifically a time period from the emission of laser light from the wavelength-scanning light source to the construction of a tomographic image. For example, it is assumed that the measurable range LC of the SS-OCT apparatus is limited to about 5 mm by the coherence length of light emitted from the wavelength-scanning light source. In this case, the optical path length of the reference light is desirably changed by 5 mm as long as the coherence length by a translation of the reference mirror by a mechanical stage. However, the 5-mm translation requires a time of 500 ms, for example, when the reference mirror is moved by a stepping motor at a velocity of 10 mm/s.

In SS-OCT measurement, each point is measured at a velocity of several hundreds μs (several kHz to several tens kHz). For example, when a tomographic image is constructed by measuring 500 lines, the measuring time is about several tens ms. Thus the SS-OCT apparatus can obtain a tomographic image at high velocity. However, by using a mechanical stage, the traveling time of the reference mirror is disadvantageously longer than the actual measuring time of the SS-OCT apparatus.

In consideration of this problem, the optical-path length adjustment mechanism 13 can preferably change the optical path length of the reference light largely by about several mm instantly at a response speed of about several ms. The optical-path length adjustment mechanism 13 of the present embodiment controls the inclination of the galvanometer mirror 16 having a high response speed, thereby discontinuously changing the optical path length of the reference light. Thus it is possible to considerably change of the optical path length of the reference light at high velocity. Specifically, it is possible to switch the optical path length of the reference light in a shorter time period than the measuring time of the SS-OCT apparatus. It is therefore possible to precisely decide whether an image from the detected optical beat signal (coherent light) is a folded image or a normal image and suppress an increase in time for tomography.

Returning to the flowchart of FIG. 2, in step S4, the arithmetic and control unit 3 causes the wavelength-scanning light source 2 again to emit light whose wavelength changes with time, after the optical path length of the reference light is changed.

The light emitted from the wavelength-scanning light source 2 is split by the first coupler 4 in a ratio of, e.g., 5% and 95%. The 5% light passes through the first circulator 5 and is collimated by the collimating lens 14. The collimated light is incident as reference light on the galvanometer mirror 16. The 95% light passes through the second circulator 6 and is incident on the measuring head 8. The light incident on the measuring head 8 is emitted as measuring light to the measuring object 11.

The light (reference light) incident on the galvanometer mirror 16 is reflected thereon, passes through the collimating lens 14 and the first circulator 5, and is incident on the second coupler 7. The light (signal light) reflected from or scattered rearward from the reflecting surface of the measuring object 11 is focused by the focusing lens 12 of the measuring head 8, passes through the second circulator 6, and is incident on the second coupler 7. The reference light and the signal light are combined by the second coupler 7 and are caused to interfere with each other. The optical beat signal of coherent light generated by the interference is detected by the differential amplifier 17.

Next, in step S5, the arithmetic and control unit 3 performs frequency analysis on the optical beat signal (intensity variation of coherent light), which has been detected by the differential amplifier 17, by using the Fourier transform circuit 19. Based on the frequency analysis result of the Fourier transform circuit 19 and (equation 2), the CPU 20 of the arithmetic and control unit 3 extracts a reflected light intensity (depth information about the measuring object 11) corresponding to the frequency of the optical beat signal.

Assuming that the reflecting surface of the measuring object 11 is located only at the depth z from the zero point before the optical path length of the reference light is changed, a reflected light intensity distribution is obtained as shown in the right part of FIG. 3 after the change of the optical path length of the reference light. In other words, after the change of the optical path length of the reference light, a reflected light intensity expressed by a distance from the zero point is detected closer to the zero point than before the change of the optical path length of the reference light. The depth of the reflected light intensity is shifted thus because a reduction in the optical path length of the reference light moves the zero point away from the wavelength-scanning light source 2 as shown in the right part of FIG. 3.

Next, in step S6, the arithmetic and control unit 3 decides whether an image of the coherent light (optical beat signal) detected before the change of the optical path length of the reference light is a normal image or a folded image, based on a change of the coherent light. In this case, a change of the coherent light as a criterion is specifically the shift amount and shift direction of the reflected light intensity distribution. The shift amount and the shift direction can be calculated based on depth information (reflected light intensity distribution) about the measuring object 11 before and after the change of the optical path length of the reference light. For example, the shift amount and the shift direction can be calculated based on a change of a position where the frequency component of the optical beat signal has a maximum value or a change of a center position when the peak shape of the frequency component of the optical beat signal is fit to a Gaussian shape. Whether an image of the coherent light is a folded image or a normal image can be decided depending on whether or not the shift amount and the shift direction correspond to an optical path length difference made by the optical-path length adjustment mechanism 13. Specifically, the optical path length difference made by the optical-path length adjustment mechanism 13 is a change of the optical path length of the reference light and the sign of the change.

As has been discussed, in the present embodiment, the optical-path length adjustment mechanism is used that can instantly switch the optical path of the reference light among multiple optical paths having known optical path length differences. Further, by using the optical-path length adjustment mechanism, the optical path length of the reference light is changed every time reflected light intensity distribution used for constructing a tomographic image is detected. By changing the optical path length, a time delay of the reference light relative to the signal light changes and the beat frequency fb also changes that is a difference between line A representing a change of the frequency of the reference light with time and line B representing a change of the frequency of the signal light with time. The frequency shift amounts of a normal image and a folded image have opposite signs. Thus in the present embodiment, a change of the optical path length of the reference light and the sign of the change are compared with a frequency shift amount and the sign of the frequency shift amount. This comparison makes it possible to decide whether the detected optical beat signal constructs a normal image or a folded image.

Figure 5A:
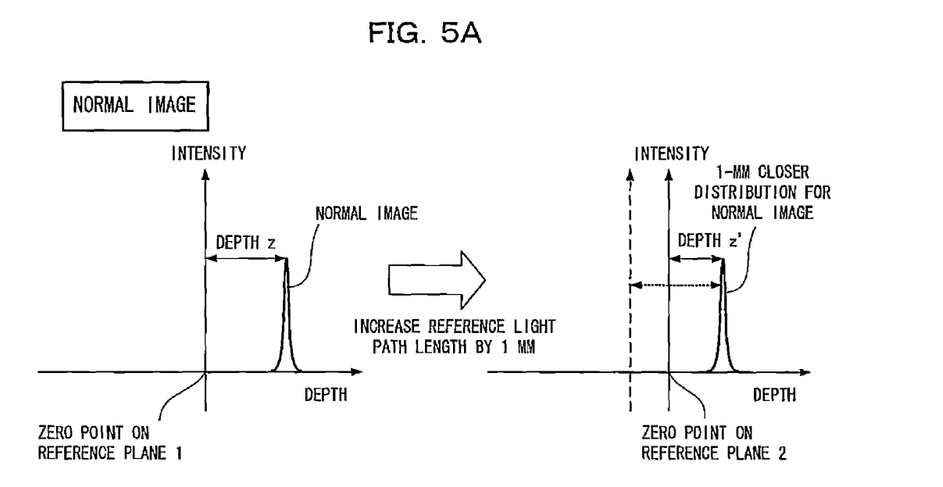
FIGS. 5A and 5B are explanatory drawings showing a method of deciding whether an image is a folded image or not according to the embodiment of the present invention.
Figure 5B:
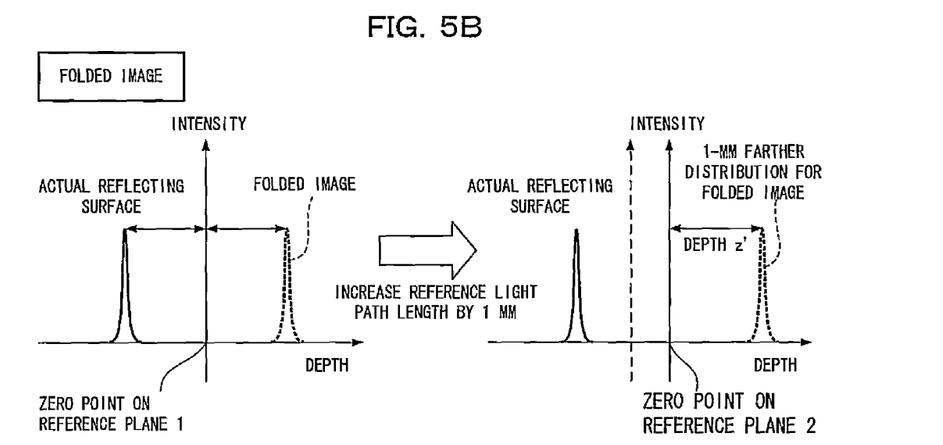

The following will specifically describe a decision whether a constructed image is a normal image or a folded image. In the following example, an image is constructed from coherent light based on light reflected from or scattered rearward from one reflecting surface. As shown in FIG. 5B, when a folded image is constructed by the reflected light intensity distribution stored before the change of the optical path length of the reference light, a 1-mm increase in the optical path length of the reference light increases the depth of the reflected light intensity distribution by 1 mm. As shown in FIG. 5A, when a normal image is constructed by the reflected light intensity distribution stored before the change of the optical path length of the reference light, a 1-mm increase in the optical path length of the reference light reduces the depth of the reflected light intensity distribution by 1 mm. Based on the change of the position of the reflected light intensity distribution and the direction of the change, it is possible to decide whether or not a folded image is constructed by coherent light detected before the change of the optical path length of the reference light, that is, whether a folded image or a normal image is constructed by the coherent light.

When a normal image is constructed by the coherent light before the change of the optical path length of the reference light, the arithmetic and control unit 3 constructs a tomographic image based on the signal of the spatial distribution of the reflected light intensity stored in the storage part 21 before the change of the optical path length of the reference light (step S7). The constructed tomographic image is displayed on the monitor 22.

When a folded image is constructed by the coherent light before the change of the optical path length of the reference light, it is necessary to match an obtained tomographic image to an actual tomographic structure. Therefore, the arithmetic and control unit 3 performs a transformation such that the spatial distribution of the reflected light intensity is inverted in the depth direction with respect to the zero point before the change of the optical path length of the reference light (step S8), the reflected light intensity being obtained before the change of the optical path length of the reference light. Further, the arithmetic and control unit 3 constructs a tomographic image based on the signal of the spatial distribution of the reflected light intensity after the transformation (step S7). The constructed tomographic image is displayed on the monitor 22.

As is evident from the explanation, in the present embodiment, the reflected light intensity distribution (depth information about the measuring object) is detected before and after the optical path length of the reference light is changed by the optical-path length adjustment mechanism. Moreover, a change of the optical path length of the reference light and the sign of the change are compared with a change of the position of the reflected light intensity distribution and the sign of the change before and after the change of the optical path length of the reference light, so that it is decided whether an obtained signal constructs a folded image or a normal image. When the signal constructs a folded image, a transformation for inverting the image is performed, so that a normal image is provided.

The following will describe other examples of the optical-path length adjustment mechanism.

Figure 6:
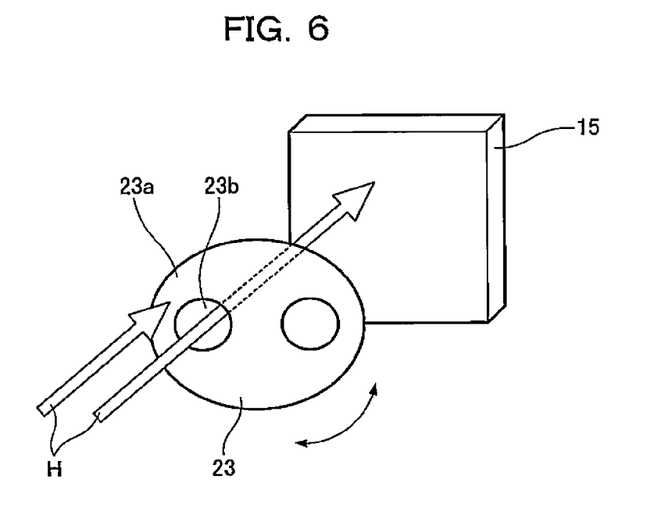
FIG. 6 is an explanatory drawing showing a first modification of the optical-path length adjustment mechanism according to the embodiment of the present invention.

FIG. 6 shows a first modification of the optical-path length adjustment mechanism. In the optical-path length adjustment mechanism of FIG. 6, a shutter mechanism 23 is provided in front of the light incident surface of the reference plane 15. The shutter mechanism 23 includes a reflective mirror 23a and passage windows 23b. The shutter mechanism 23 is a rotary mechanism. When the shutter mechanism 23 rotates, the reflective mirror 23a and the passage window 23b alternately appear in the optical path of the reference light H.

The phase of the rotation of the shutter mechanism 23 is controlled by the arithmetic and control unit 3. When the phase of the rotation of the shutter mechanism 23 is controlled such that the reflective mirror 23a blocks the optical path of the reference light H, the reference light H is reflected on the reflective mirror 23a. When the phase of the rotation of the shutter mechanism 23 is controlled so as to allow the passage of the optical path of the reference light H through the passage window 23b, the reference light H passes through the passage window 23b and is reflected on the reference plane 15.

The optical-path length adjustment mechanism of FIG. 6 controls the phase of the rotation of the shutter mechanism 23 such that the reflection of the reference light H is switched between the reference plane 15 and the reflective mirror 23a. Thus the optical path length of the reference light can be changed in two steps.

Figure 7:
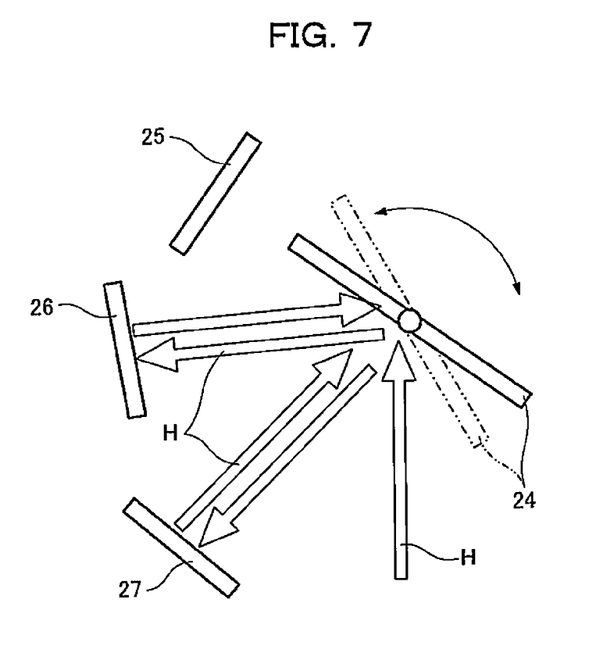
FIG. 7 is an explanatory drawing showing a second modification of the optical-path length adjustment mechanism according to the embodiment of the present invention.

FIG. 7 shows a second modification of the optical-path length adjustment mechanism. The optical-path length adjustment mechanism includes: a galvanometer mirror 24 on which the reference light H is incident; and multiple (three) reference planes 25 to 27 that are located at different distances from the galvanometer mirror 24. The galvanometer mirror 24 can rotate in a certain range about an axis perpendicular to the plane of FIG. 7.

The inclination (rotation angle) of the galvanometer mirror 24 is controlled by the arithmetic and control unit 3. The optical-path length adjustment mechanism causes the reference light H to be incident on one of the reference planes 25 to 27 by changing the inclination of the galvanometer mirror 24. The reference light H reflected from the reference plane is reflected on the galvanometer mirror 24 and returns to the collimating lens 14.

The optical-path length adjustment mechanism of FIG. 7 controls the inclination (rotation angle) of the galvanometer mirror 24 such that the incidence of the reference light H is switched between the reference planes 25 to 27, thereby switching the optical path of the reference light H among multiple optical paths having different optical path lengths. Further, the optical-path length adjustment mechanism can select one of the reference planes located at different distances from the galvanometer mirror, as a plane reflecting the reference light. Thus a difference in the optical path length of the reference light can be selected from multiple differences in optical path length.

Figure 8:
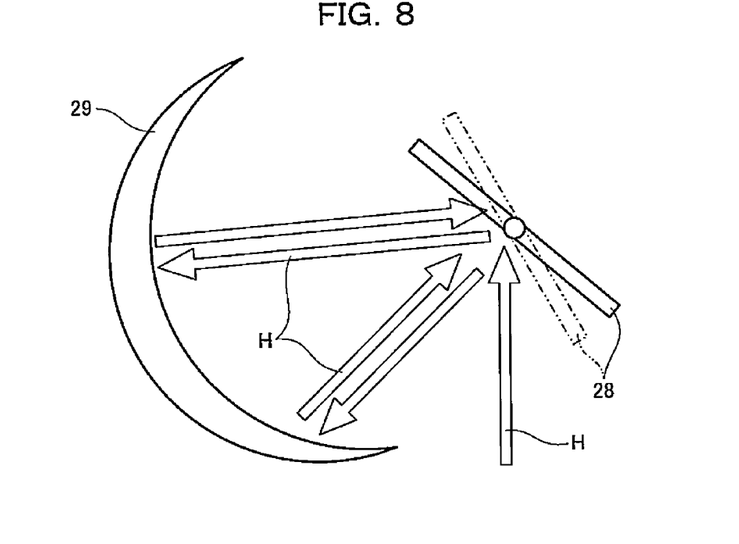
FIG. 8 is an explanatory drawing showing a third modification of the optical-path length adjustment mechanism according to the embodiment of the present invention.

FIG. 8 shows a third modification of the optical-path length adjustment mechanism. The optical-path length adjustment mechanism includes: a galvanometer mirror 28 on which the reference light H is centrally incident; and a reference plane 29 of a cycloid curve on which the reference light H reflected from the galvanometer mirror 28 is incident. The galvanometer mirror 28 can rotate in a certain range about an axis perpendicular to the plane of FIG. 8. The reference plane 29 of a cycloid curve has a light incident surface at a continuously varying distance from the center of the galvanometer mirror 28.

The inclination (rotation angle) of the galvanometer mirror 28 is controlled by the arithmetic and control unit 3. The optical-path length adjustment mechanism changes the inclination of the galvanometer mirror 28, so that the reference light H reflected at the center of the galvanometer mirror 28 is incident at varying positions on the light incident surface of the reference plane 29 of a cycloid curve. The reference light reflected from the reference plane 29 of a cycloid curve passes through the same optical path as incidence on the reference plane 29, and then the reference light returns to the collimating lens 14. Therefore, the optical path length of the reference light is changed by the inclination of the galvanometer mirror 28.

The optical-path length adjustment mechanism of FIG. 8 controls the inclination (rotation angle) of the galvanometer mirror 28 so as to switch the positions of incidence of the reference light H on the reference plane 29 of a cycloid curve, thereby switching the optical path of the reference light among multiple optical paths having different optical path lengths. Further, the optical-path length adjustment mechanism of FIG. 8 can continuously, not discretely, change the optical path length of the reference light.

Figure 9:
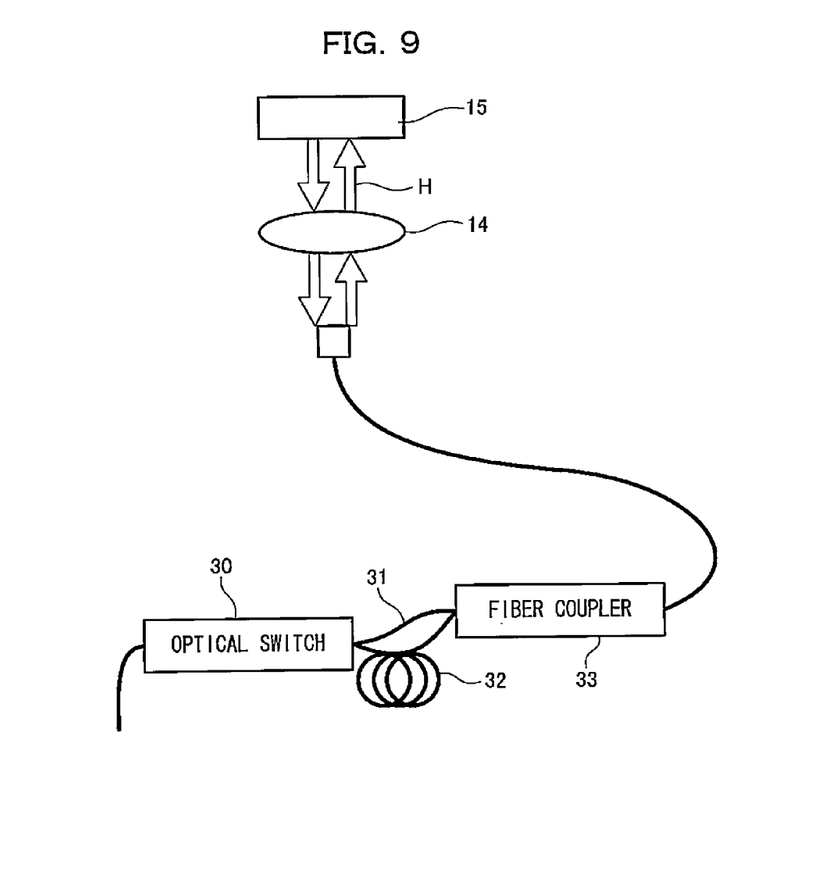
FIG. 9 is an explanatory drawing showing a fourth modification of the optical-path length adjustment mechanism according to the embodiment of the present invention.

FIG. 9 shows a fourth modification of the optical-path length adjustment mechanism. The optical-path length adjustment mechanism includes: an optical switch 30 that is connected to the first circulator 5 of FIG. 1 via an optical fiber; multiple (two) optical fibers 31 and 32 having different lengths; and a fiber coupler 33.

The optical switch 30 emits the incident reference light H from one of the two output ports of the optical switch 30 so as to correspond to a signal from the arithmetic and control unit 3. The two output ports of the optical switch 30 are respectively connected to one ends of the optical fibers 31 and 32 having different lengths. The other ends of the optical fibers 31 and 32 are respectively connected to the two light receiving ports of the fiber coupler 33.

The reference light H is incident on the optical switch 30 and then is emitted from the output port selected by a signal from the arithmetic and control unit 3. The reference light H emitted from the optical switch 30 passes through one of the optical fibers 31 and 32 and is incident on the collimating lens 14 through the fiber coupler 33. The collimating lens 14 collimates the reference light H. The collimated reference light H is incident on the reference plane 15. The reference light H reflected from the reference plane 15 passes through the same optical path as the incidence on the reference plane 15, and then the reference light H returns to the first circulator 5.

The optical-path length adjustment mechanism of FIG. 9 switches the emission of the reference light H between the two output ports of the optical switch 30, thereby varying the optical path length of the reference light in two steps.

In the optical-path length adjustment mechanism of FIG. 9, a circulator may be inserted between the collimating lens 14 and the fiber coupler 33 to prevent the passage of reflected light through the fiber coupler 33. This configuration can reduce an optical intensity loss caused by the fiber coupler 33.

Further, according to the optical-path length adjustment mechanism of FIG. 9, the switching speed of the optical path lengths of the reference light is about 100 μs, which is equal to the response speed of the optical switch. Thus it is possible to easily switch the optical path lengths at high speed. The optical switch has the multiple output ports, easily making two or more differences in the optical path length of the reference light.

Figure 10:
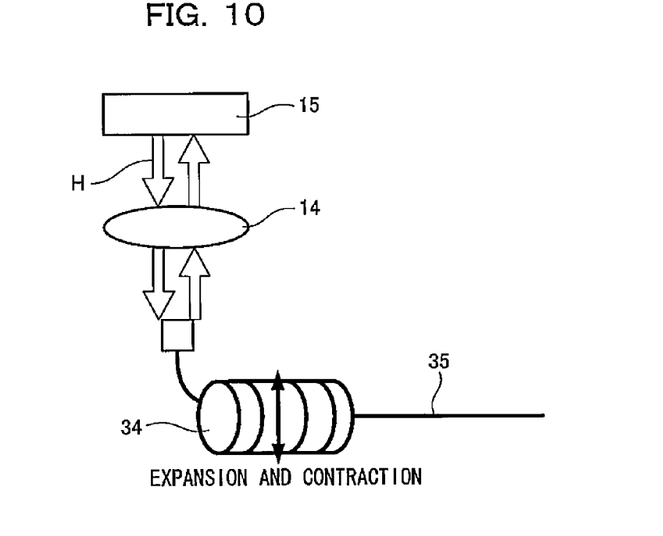
FIG. 10 is an explanatory drawing showing a fifth modification of the optical-path length adjustment mechanism according to the embodiment of the present invention.

FIG. 10 shows a fifth modification of the optical-path length adjustment mechanism. In the optical-path length adjustment mechanism, an optical fiber 35 connected to the first circulator 5 of FIG. 1 is wound several times around a cylindrical member 34 extendable in the radial direction. The cylindrical member 34 may be, e.g., a drum-type piezoelectric element.

The cylindrical member 34 expands and contracts in the radial direction in response to a signal from the arithmetic and control unit 3. The expansion and contraction of the cylindrical member 34 in the radial direction can apply a stress to the optical fiber 35, deforming the fiber length. The deformation can change the optical path length of the reference light. A change of the optical path length of the reference light can be adjusted according to a change of the diameter of the cylindrical member 34 and the number of turns of the optical fiber 35 around the cylindrical member 34. Therefore, the optical-path length adjustment mechanism of FIG. 10 can switch the optical path of the reference light among multiple optical paths having different optical path lengths by changing the diameter of the cylindrical member 34.

Figure 11:
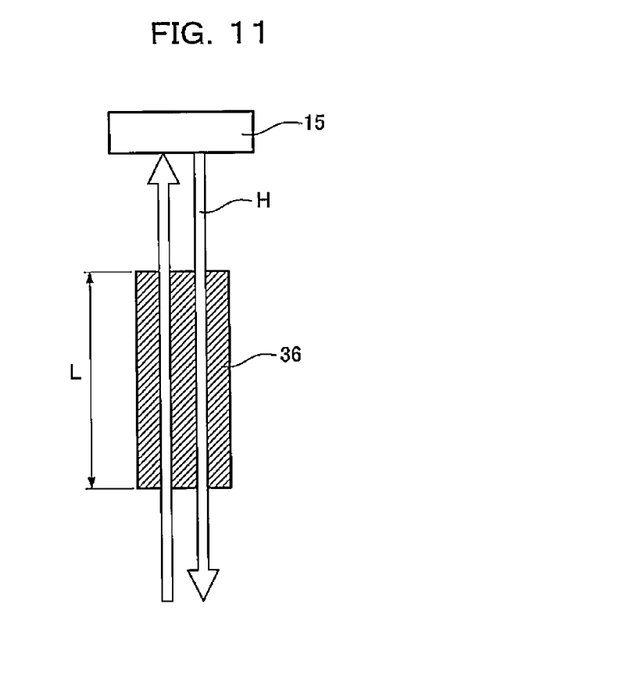
FIG. 11 is an explanatory drawing showing a sixth modification of the optical-path length adjustment mechanism according to the embodiment of the present invention.

FIG. 11 shows a sixth modification of the optical-path length adjustment mechanism. The optical-path length adjustment mechanism includes a transparent member 36 inserted between the collimating lens 14 (not shown) and the reference plane 15. The transparent member 36 has an index of refraction n (n≤1) and a length L. The transparent member 36 may be, e.g., a glass member. The transparent member 36 is fixed on, e.g., the motor shaft of a single-axis motor (not shown) and can be moved out of the optical path of the reference light by rotating the motor shaft. With this configuration, a change of the optical path length of the reference light is 2 L (n−1).

In the present embodiment, the light source unit is a wavelength-scanning light source that emits laser light having a wavelength changing with a constant period. The light source unit may emit light with low coherence.

The present embodiment described a configuration in which light such as measuring light and reference light passes through the optical fiber. The present invention is not limited to a configuration in which light is transmitted through an optical fiber. Light may be transmitted in the air or in vacua.

In the present embodiment, the optical-path length adjustment mechanism is provided in the optical path of the reference light. The optical-path length adjustment mechanism may be provided in the optical path of the signal light or the measuring light instead of the optical path of the reference light. Alternatively, the optical-path length adjustment mechanisms may be provided in the optical path of the signal light or the measuring light as well as in the optical path of the reference light.

Further, in the present embodiment, the interferometer is a Michelson interferometer. The interferometer is not particularly limited and other kinds of interferometers, e.g., a Mach-Zehnder interferometer may be used.

Moreover, in the present embodiment, FD-OCT of a wavelength-scanning light source type was used. FD-OCT in the present invention is not particularly limited and FD-OCT of a spectrometer type may be used.

In the present embodiment, Fourier transform was used for frequency analysis of the optical beat signal because Fourier transform can shorten the time for frequency analysis of the optical beat signal. In other words, in order to shorten the time for frequency analysis, fast Fourier transform is preferably used in which signals are discretely sampled with $2^n$ samples. However, the present invention is not limited to Fourier transform and a spectrum analyzer may be used.

Further, in the present embodiment, it is decided whether the detected optical beat signal (coherent light) creates a normal image or a folded image depending on whether or not a shift amount and the shift direction of the reflected light intensity distribution correspond to a change of the optical path length of the reference light and the sign of the change. However, whether a detected image is a folded image or not may be decided depending only on whether or not the shift direction of the reflected light intensity distribution corresponds to the sign of a change of the optical path length of the reference light.

According to the present embodiment, even when a folded image may be created, which is a fundamental problem of optical interference measurement, it is possible to easily decide whether detected coherent light (optical beat signal) creates a normal image or an image inverted from the normal image. Therefore, it is possible to solve the problem of a folded image of coherent light (optical beat signal) detected by an optical interference phenomenon. Consequently, the present invention is effective for in-line measurement of multiple samples having reflecting surfaces with uneven heights, particularly for automatic measurement in which the position of a measuring object cannot be manually adjusted.

Having specifically described exemplary embodiments of the present invention, it is easily understood by those skilled in the art that various changes can be made in the exemplary embodiments without substantially departing from a new teaching of the present invention and the effect of the present invention. Thus these changes are intended to be embraced in the scope of the present invention.

What is claimed is:

1. An optical interference measuring method comprising:
splitting light from a light source unit into measuring light and reference light;
detecting coherent light obtained by interference of the reference light and the measuring light reflected from or scattered rearward from a measuring object;
changing an optical path length of either the reference light or the measuring light;
deciding whether an image created by the coherent light is a normal image or a folded image, based on a shift direction of a peak intensity in the coherent light corresponding to the change of the optical path length; and
measuring the measuring object from the coherent light, based on a result of the decision about whether the image is the normal image or the folded image.

2. The optical interference measuring method according to claim 1, wherein the image consists of the coherent light detected before the changing the optical path length.

3. The optical interference measuring method according to claim 1, wherein, in the changing the optical path length, a range of the change of the optical path length is equal to a measureable range which is limited by a coherent length of the light from the light source.

4. The optical interference measuring method according to claim 1, wherein, in the changing the optical path length, the optical path length is changed by applying a stress to an optical fiber in which the reference light passes through.

5. The optical interference measuring method according to claim 1, wherein the light emitted from the light source unit has a wavelength changing with a constant period, and
the coherent light is frequency-analyzed to obtain a tomographic image of the measuring object.

6. The optical interference measuring method according to claim 1, wherein the light emitted from the light source unit is low coherence light.

7. An optical interference measuring apparatus comprising:
a light source unit for emitting light;
an optical splitter for splitting the light from the light source unit into measuring light and reference light;
a coherent light detector for detecting coherent light obtained by interference of the reference light and the measuring light reflected from or scattered rearward from a measuring object;
an optical-path length adjustment mechanism for changing optical length either reference light or the measuring light; and
an arithmetic and control unit for deciding whether an image created by the coherent light is a normal image or a folded image, based on a shift direction of a peak intensity in the coherent light corresponding to driving of the optical-path length adjustment mechanism.

8. The optical interference measuring apparatus according to claim 7, wherein the image consists of the coherent light detected before the driving the optical-path length adjustment mechanism.

9. The optical interference measuring apparatus according to claim 7, wherein a range of the change of the optical path length for driving the optical-path length adjustment mechanism is equal to a measureable range which is limited by a coherent length of the light from the light source.

10. The optical interference measuring apparatus according to claim 7, wherein optical-path length adjustment mechanism changes the optical path length by applying a stress to an optical fiber in which the reference light passes through.

* * * * *